United States Patent [19]

Kirschman et al.

[11] 4,110,170
[45] Aug. 29, 1978

[54] HOME WATER DISTILLER

[76] Inventors: Fred C. Kirschman, Briardale Rte. 2, Bismarck, N. Dak. 58501; Wallace B. Bolte, Box 204, Regent, N. Dak. 58650

[21] Appl. No.: 681,051

[22] Filed: Apr. 28, 1976

[51] Int. Cl.² .............................................. B01D 3/42
[52] U.S. Cl. .................................... 202/160; 202/180; 202/181
[58] Field of Search ................... 202/160, 185 C, 206, 202/167, 180, 185 D, 194, 196, 189–193, 181; 203/2; 196/132

[56] References Cited

U.S. PATENT DOCUMENTS

| | | | |
|---|---|---|---|
| 496,488 | 5/1893 | Ruud | 202/193 X |
| 587,506 | 8/1897 | Pierce et al. | 203/DIG. 17 |
| 650,501 | 5/1900 | Bailey | 203/DIG. 17 |
| 662,765 | 11/1900 | Chase | 202/190 |
| 697,912 | 4/1902 | Chase | 203/DIG. 17 |
| 790,901 | 5/1905 | Keith | 202/193 |
| 825,178 | 7/1906 | Barnstead | 202/190 |
| 882,811 | 3/1908 | Bailey | 202/192 |
| 1,369,438 | 2/1921 | Jewell | 203/DIG. 17 |
| 1,372,865 | 3/1921 | Crane | 203/DIG. 17 |
| 2,202,218 | 5/1940 | Mallory | 202/160 |
| 2,254,538 | 9/1941 | Newman | 202/193 X |
| 2,441,361 | 5/1948 | Kirgan | 202/160 |
| 2,467,174 | 4/1949 | Wilson | 203/2 |
| 2,467,174 | 4/1949 | Wilson, Jr. | 203/2 |
| 2,475,482 | 7/1949 | Clemens | 202/180 X |
| 3,318,784 | 5/1967 | Murphy | 202/160 |
| 3,345,271 | 10/1967 | Shay et al. | 203/2 |
| 3,364,731 | 1/1968 | Hook | 202/160 |

*Primary Examiner*—Norman Yudkoff
*Attorney, Agent, or Firm*—Kinney, Lange, Westman and Fairbairn

[57] ABSTRACT

A home water distiller which provides for an efficient distillation process wherein the inlet water supply is controlled as a function of the temperature of the output of the distiller, and which inlet water is preheated by introducing it into a chamber surrounding the condensor coils. After preheating, the water flows into the boiling chamber. The unit is provided with a flow-through or constant-flush drainage system to keep mineral buildup to a minimum, and to provide for automatic control of the input water.

8 Claims, 5 Drawing Figures

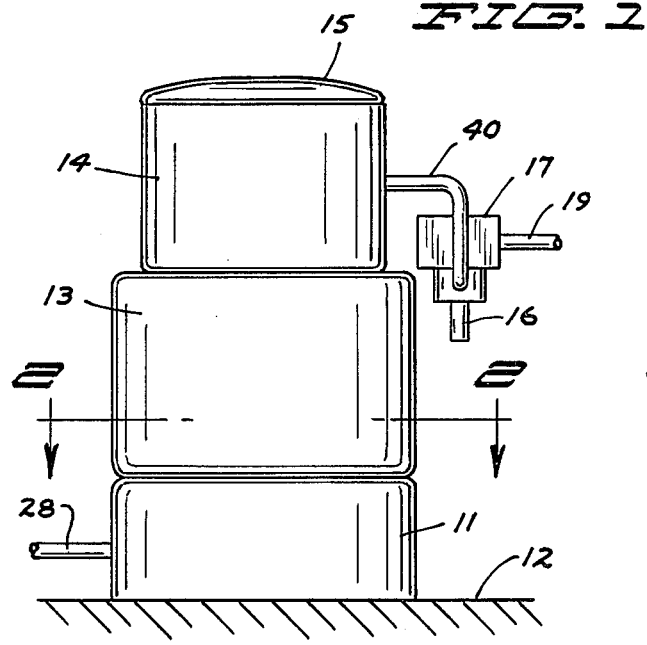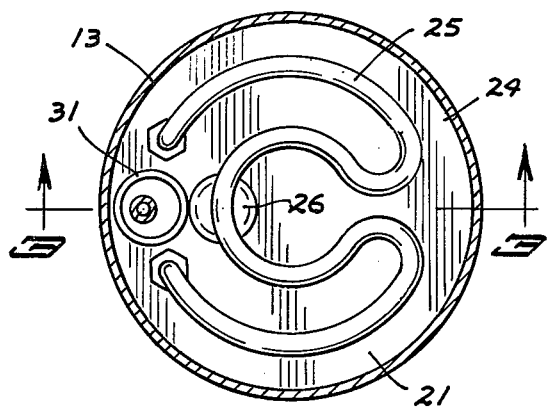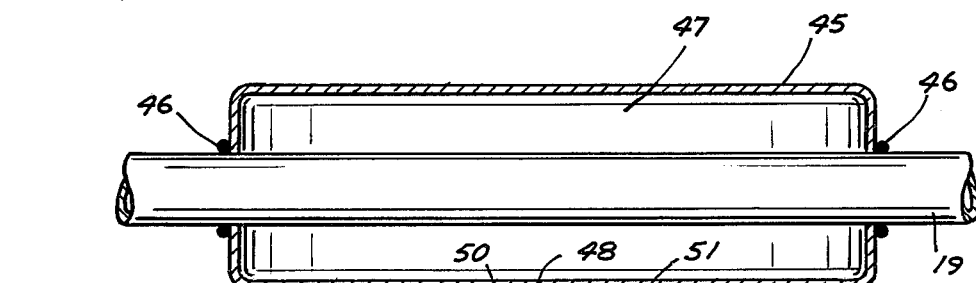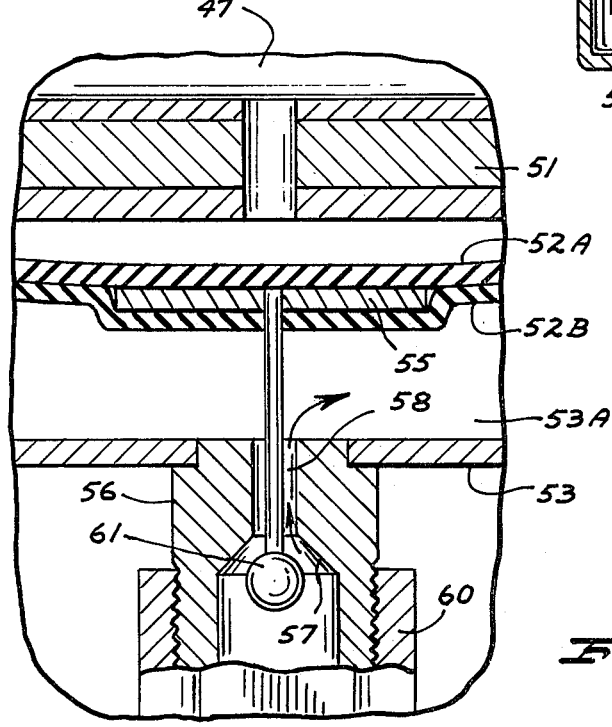

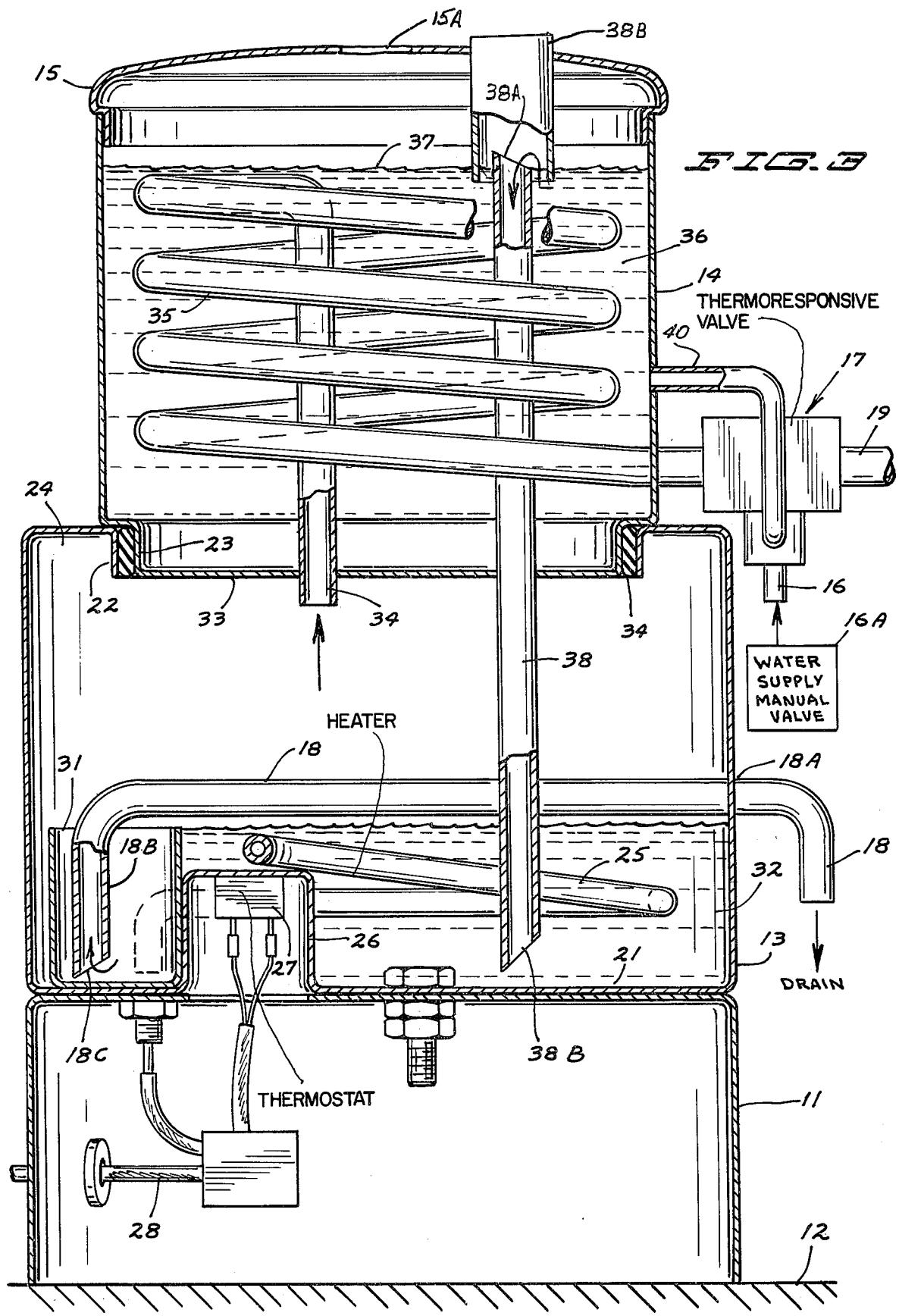

HOME WATER DISTILLER

BACKGROUND OF THE INVENTION

1. Field of the Invention

The present invention relates to home water distillers.

2. Prior Art

Various water distillers have been advanced in the prior art, including units which preheat the water before it enters the boiling chamber. U.S. Pat. No. 284,011 includes a top supply tank, a lower chamber in which the condensing coils are located, and in which the water is preheated, and a separated boiling chamber.

U.S. Pat. No. 532,377 also shows a still that has a type of preheating chamber in that the supply tank water surrounds the condensing chamber. An upright fill tube in the supply chamber is used, and when the water in the supply chamber is drawn off (with a manual valve), it comes through the top of the upright fill tube.

A preheater arrangement is also shown in U.S. Pat. No. 1,611,673. U.S. Pat. No. 3,055,810 shows a water purification system which has a drain that flushes out minerals and similar materials, although the flush arrangement is not directly in the boiling chamber. A preheat chamber also is shown in this patent.

Other examples of the prior art include U.S. Pat. Nos. 2,254,538; 2,696,465; 2,475,482; 3,532,606; 3,345,271; and 3,935,077.

SUMMARY OF THE INVENTION

The present invention relates to a water distiller which utilizes a sensor on the output of the still to sense the temperature of the distillate and use this temperature as a control for admitting makeup water or new water to the still. The still operates on a continuous basis, when in operation, and is self-controlled at an efficient level of operation.

In the form shown a two-compartment still is utilized, one compartment being a boiling chamber where the water is turned into vapor, and a second compartment being a preheat condensing chamber in which the condensing coil is mounted. The boiling chamber creates steam that is fed to the condensing coil. The inlet (raw) water first goes into the preheat chamber and surrounds and submerges the condensing coil so that the water is preheated by the steam in the condensing coil. The overflow water from the preheat chamber goes into the boiling chamber so that it is at a relatively high temperature when it enters the boiling chamber. The boiling chamber is closed, of course, except for the outlet leading to the condensing coil and except for a drain arrangement wherein a constant flush or low level flow-through of water from the boiling chamber through the drain is maintained to keep minerals and the like from building up inside the boiling chamber.

The heat sensor responsive to the output temperature of the condensing coil may be set at any desired level so that the input water is admitted when the temperature of the water coming from the condensing coil, that is the distilled water, reaches a predetermined temperature range. New cold water is then admitted to the preheat chamber. In this manner, the cold water coming into the preheat chamber is used as coolant water and the previously heated water is admitted into the boiling chamber. The control is not a level control but responds to a separate parameter (as shown heat) to control the water flow automatically.

The unit in the form shown in readily adapted for use in home stills, and can be arranged in a very compact unit with the boiling chamber forming the lower portion of the unit, and an upper chamber housing the condensor coil and the preheat water.

The sensor assembly used for sensing the output temperature of the condensing coil in the form shown comprises a sensing diaphragm-type actuator that in turn operates a small check valve. The diaphragm is open to an enclosed volume of a suitable fluid such as alcohol that will vaporize at a lower temperature than water, and which alcohol is placed in intimate contact with the outlet tube from the condensor coil. The expansion of the alcohol actuates the diaphragm to open the check valve and admit additional inlet water into the preheat chamber as a function of the temperature on the output side of the condensor coils.

Various types of sensors for controlling the valve of course may be used, and the form illustrated is merely for purposes of showing the best way presently contemplated by the inventors for carrying out this important function. The sensor can be located on the interior of the preheat chamber and sense temperature of the coil in that location. Temperature of the preheat water also is a function of the coil output temperature, so that preheat water temperature also could be sensed if desired.

The use of a heat sensor, sensing temperatures which vary as a function of the output temperatures, for controlling flow of inlet water eliminates many of the problems normally associated with float controls and other similar controls, and provides automatic operation of the still once it is functioning.

It is reliable and safe. The flow-through feature of the drain in the boiling chamber prevents pressure from building up to an excessive level as well as ensuring a lack of buildup of minerals or the like from the raw water being introduced.

BRIEF DESCRIPTION OF THE DRAWINGS

FIG. 1 is a side elevational view of a typical home water distiller made according to the present invention;

FIG. 2 is a sectional view taken as on line 2—2 of FIG. 1;

FIG. 3 is a sectional view taken as on line 3—3 in FIG. 2 with parts in section and parts broken away;

FIG. 4 is an enlarged sectional view of a heat sensor on the output line of the condensor coil; and FIG. 5 is a further enlarged fragmentary view of a typical control diaphragm and check valve assembly for the heat sensor.

DESCRIPTION OF THE PREFERRED EMBODIMENT

The home water distiller illustrated generally at 10 as shown has a support base 11 for supporting the distiller on a surface 12. The still itself includes a lower boiling chamber 13, an upper preheat-condensor chamber 14, that is mounted on the lower chamber or compartment 13 and includes a cover 15 at the upper end thereof.

An inlet water supply line 16 passes through a control valve assembly 17 that will control water flow into the preheat compartment 14. A drain line 18 leading from the boiling chamber is connected to a suitable household drain, and the output tube portion 19 of the condensing coil, which will be more fully explained, leads to the distilled water supply, where the distilled water is stored for use.

The boiling compartment 13, as shown (FIGS. 2 and 3), forms an enclosed chamber 24 having a bottom wall 21, and a top annular flange 22 which defines an opening of size to receive a lower neck portion 23 of the upper compartment 14, so that the upper compartment will close the boiling chamber 24. A heater unit, for example, a Calrod heater unit, indicated generally at 25, is mounted adjacent the bottom wall 21 on the interior of the boiling chamber 24. One portion of the heater unit 25 as shown rests on a small housing 26, raised from the bottom wall, and a safety thermostat 27 for sensing overheating of the heater unit is positioned on the exterior of the boiling chamber within the housing 26, so that the thermostat receives a temperature signal indicating the temperature of the heater itself. This sensor 27 is an ordinary thermostatic control interposed between a power cord 28 from a home electric power supply and the heater unit so that it will shut off power to the heater unit if the heater unit becomes overheated.

The lower chamber or boiling chamber 24 has a small open top cup 31 mounted therein and attached to lower wall 21. The cup 31 is mounted so that the upper edge is at the desired boiling chamber water level. The water is shown at 32. The water level reaches this upper edge level for the cup 31, and as can be seen the heater unit 25 is then submerged so that it will boil the water 32 causing steam to be formed inside the boiling chamber 24.

The drain line 18 passes into and is sealed with respect to the wall of the boiling chamber as at 18A, and has a right angle bend portion 18B that extends into the cup 31. An open end 18C of the drain line 18 is cut at an angle and is near the bottom of this cup 31. As will be explained, water that overflows into the cup 31 will be forced out through the opening 18C, and through the tube 18 to drain because of the pressure on the inside of the boiling chamber 24. The level of the water 32 is maintained level with the upper edge of the cup 31 which edge forms a control weir establishing a control level of water in the chamber. Water vapor or steam is in the chamber above the water level.

Because the upper housing 14 has a closed bottom wall 33, and because the flanges 22 and 23 are sealed with respect to each other through a suitable gasket 34, pressure will build up in the boiling chamber. As can be seen an inlet end portion 34 of a condensor coil tube 35 is sealed with respect to the wall 33 and it is open to the boiling chamber 24. Steam forming in the chamber 24 will therefore be forced into the open end 34, (the opposite end 19 of the coil 35 is at atmospheric pressure), and up through the condenser coil 35.

The condenser coil 35 is fitted or coiled within the preheat chamber 36 defined by the compartment 14, and as shown, the condenser coil is surrounded by water in the chamber 36. The water level in chamber 36 is indicated at 37, and the level is controlled by the height of a boiling chamber inlet tube 38 that is fixed with respect to the bottom wall 33 of the compartment 14, and passes also into the boiling chamber 24. As can be seen, the upper end 38A of this tube 38 is cut at a slight angle so that water exceeding the level 37 will flow into the tube as indicated by the arrow, and will be discharged below the level of the water 32 in the boiling chamber through the open end 38B of tube 38. This inlet tube 38 will feed the water from the chamber 36 (which is the preheat and condenser chamber) so that hot water will be supplied to the boiling chamber to make for more efficient operation of the still itself. A protective tube 38B is attached to the cover and is inverted over the end 38. The lower end of tube 38B is about ⅛ inch below the water level to keep gases from entering the boiling chamber.

The cover 15 will cover the preheat chamber 14, and has a top opening or vent 15A to permit escape.

The raw water, or the input water, coming from a water supply 16A, which can be a manually adjustable valve to control flow from a pressure source, passes into the line 16 and through the sensor and valve assembly 17, and then through a tube 40 that opens from the sensor and valve to the interior of the preheat chamber 36. Cold water coming from the water supply 16A will be supplied to the preheat chamber. The water supply 16A is normally a pressure supply such as a home water faucet. Any supply with sufficient pressure to cause flow to the chamber 36 when the control valve is open is satisfactory.

The sensor and valve assembly 17 is positioned to sense temperature of the output portion 19 of the coil 35, which protrudes from the compartment 14. The details of the sensor and valve are shown in FIGS. 4 and 5. As shown, the output tube 19 passes through a housing 45, that is sealed as at 46 at its ends to tube 19, and forms a chamber 47 surrounding the tube 19. This chamber 47 is an expansion chamber, and can be filled with suitable fluid, such as alcohol or other fluids. Port 48 leads from the chamber 47 through a passageway 50 defined in a pair of mounting plates 51 to provide a passageway for pressure from chamber 47 to act against a first diaphragm member 52 that is held at its peripheral edges between the mounting plates 51, and a bell housing 53.

As shown, the diaphragm assembly 52 includes two deflectable diaphragm members 52A and 52B, one of which is open to the passageway 50 and the other of which has an opening through which a stem 54 of a headed actuator passes. The head 55 attached to the stem 54 is shown sandwiched between the diaphragm members 52A and 52B.

A check valve body 56 is mounted to the housing 53 and has a check valve seat 57 defined on the interior. A passageway 58 opens to the check valve seat from the chamber 53A of the housing 53, and the stem 54 passes through this passageway 58 with sufficient clearance to permit liquids to pass through the passageway 58 as well. The check valve housing 56 is coupled to the inlet line 16 through a suitable coupling 60, so that water under pressure from the water source 16A will force a ball check 61 against the check valve seat 57 under normal operation to prevent water from passing through the passageway 58 into the interior of the housing 53.

However, when the pressure in the chamber 47 increases because of the temperature of the tube 19, it will cause expansion of fluid and at high enough temperatures cause vaporization of fluids and increased pressure in the housing 47, thereby acting on the diaphragm assembly 52 to deflect the upper diaphragm 52A away from the support and toward the check valve ball 61. The plunger 54 will move the check valve ball 61 away from the seat 57, and permit water from the line 16 to flow in the passageway 58, into the interior chamber 53A of the housing 53, and out through the line 40 into the preheat chamber. The introduction of fresh water from the water supply 16A through the sensor assembly will cause the preheat water to cool, and therefore also cause the temperature of the condensor 35 to drop which in turn will cause the temperature of the distilled water coming through the line section 19 and through the sensor to cool off.

This will permit the alcohol or fluid in the chamber 47 to contract in volume reducing the pressure and permitting the diaphragm assembly 52 to move in direction away from the check valve. The ball 61 of course will be tending to seat itself because of differential pressures, and it will seat causing inlet water to close off. As the distillation process continues, the water in chamber 36 will heat and the temperature of the distilled water in the output line 19 will rise, and the valve action will repeat itself upon expansion of the fluid in the chamber 47 sufficiently to open the check valve and move the ball 61 away from the seat 57.

The sensor and valve assembly 17 therefore is a-thermo responsive element which modulates as the temperature of the output tube 19 of the condenser coil rises and falls. As water is introduced into the preheat chamber, it will raise the water level in the chamber 36 so that inlet water will flow into the end 38A of the tube 38 and will be admitted under gravity to the boiling chamber 24. This introduction of new or fresh water will keep a supply of water in the boiling chamber adequate to cover the heater unit. The supply is set or metered, by valve sizes and the like to provide more water to the boiling chamber than that which is evaporated to have the flushing drain operation, and if water is not added to the boiling chamber the temperature of the boiling chamber will rise causing greater pressure to be present inside, and therefore causing the temperature in the condenser coil to rise at the output tube 19. When the temperature rises in the tube 19 (which is part of coil 35) the sensor will again cause the valve to open admitting cooler water and causing more water to be introduced into the boiling chamber. The preferred range of temperatures of condensate in tube 19 at which opening of the inlet valve occurs is in the range of 190° to 210° F.

When the water level in the boiling chamber raises up above the edge of the cup 31, (and the supply, as stated is purposefully set to keep some excess water coming in at least periodically), water will accumulate inside this cup until the pressure on the inside of the boiling chamber is sufficient to cause the water to be forced out through the drain line 18 to an ordinary household drain.

The unit is set so that it will modulate under normal operations to keep admitting water through the tube 40 on a substantially continuous basis and keep water flushing through the boiling chamber and drain tube 18 so that no minerals will build up in the boiling chamber, and a high output efficient still is provided. The inlet valve assembly controlling the water can be set to provide the desired amount, or a separate manual faucet forming the water supply can be adjusted by the user to obtain the necessary flushing. The preheating of the water used for distilling helps conserve energy and make efficient use of the unit.

While a particular sensor and valve is utilized, it is to be understood that other heat sensors for controlling valves to admit water into the still can be utilized. Solenoid valves actuated from heat sensors which control switches, for examples, may be used. Also, while the diaphragms 52A, 52B are indicated as being synthetic materials, they can also be thin stainless steel diaphragms, and also could be corrugated metal diaphragms. The actuating probe or stem 54 can also be attached directly to the diaphragm so that two diaphragms do not have to be used. The control of liquid to the preheating chamber is responsive to a parameter other than the level of liquid. This is different than float control. The temperature sensor used can be placed directly on coil 35 if desired, or even may be used to sense water temperature of water in claim 36. The sensed temperature is a function of the distillate temperature, and on the output tube 19 the most precise control is believed to be obtainable.

What is claimed is:

1. A home water distilling apparatus comprising a housing defining a boiling chamber, heating means to heat and evaporate water in said boiling chamber, a water level control in said boiling chamber comprising drain means opening to said boiling chamber and permitting flow of excess water from said boiling chamber over a weir when the water level exceeds the control level of said weir in said boiling chamber, means associated with said housing defining a preheat water chamber having an inlet and a supply passageway forming an outlet from said preheat chamber to said boiling chamber and permitting free flow of water from said preheat chamber to said boiling chamber when the water level in the preheat chamber is above a desired level, said supply passageway opening to said boiling chamber below the control level of said weir, valve means to control flow of input water from a source to said preheat water chamber at the inlet to the preheat water chamber, means forming a condenser passageway having an inlet operatively connected to receive water vapor from said boiling chamber and having an outlet for distilled water, said means forming a condenser passageway being positioned to provide heat transfer from water vapor in the condenser passageway to water in said preheat water chamber, said valve means including a thermo responsive portion operable as a function of the temperature of distilled water in the condenser passageway to open said valve means to admit inlet water from a source to said preheat water chamber and permit flow through said supply passageway to said boiling chamber when the thermo responsive portion senses a temperature greater than a desired level.

2. The combination specified in claim 1 wherein said valve means comprises a check valve operable to control flow of water from said source to said prehat chamber, and said thermo responsive portion includes means to actuate said check valve to an open position when the temperature sensed by the thermo responsive portion is greater than said desired level.

3. The combination specified in claim 1 wherein said thermo responsive portion opens said valve means to admit water to said distilling device in response to a temperature of distilled water in the range of 190° to 210° Fahrenheit at the outlet of said condenser passageway.

4. The device of claim 1 wherein said preheat chamber is mounted above said boiling chamber.

5. The home water distilling apparatus of claim 16 wherein said water level control comprises a wall forming a chamber and having an upper edge defining said weir to establish the control level of water in said boiling chamber.

6. The home water distilling apparatus of claim 5 wherein said drain means comprises a drain tube opening on the interior of the chamber formed by said wall, said tube having an outlet opening on the exterior of said boiling chamber.

7. The home water distilling apparatus as specified in claim 1 wherein said means forming a condenser passageway includes a tubular portion adjacent the outlet of said condenser passageway, said tubular portion adjacent said outlet carrying distilled water and being in heat transfer relationship to said thermo responsive portion.

8. The home water distilling apparatus of claim 1 wherein said valve means to control flow of input water from a source to said preheat chamber is controlled by said thermo responsive portion to supply water in a larger quantity than the water which is evaporated in the boiling chamber, to thereby provide a flow of water through the preheat chamber and boiling chamber and across the weir to said drain means.

* * * * *

UNITED STATES PATENT OFFICE
CERTIFICATE OF CORRECTION

Patent No. 4,110,170          Dated August 29, 1978

Inventor(s) Fred C. Kirschman et al.

It is certified that error appears in the above-identified patent and that said Letters Patent are hereby corrected as shown below:

Column 6, line 59, (Claim 5, line 1), "Claim 16" should be --Claim 1--.

Signed and Sealed this

Thirteenth Day of March 1979

[SEAL]

Attest:

RUTH C. MASON
Attesting Officer

DONALD W. BANNER
Commissioner of Patents and Trademarks